(12) United States Patent
Schuster et al.

(10) Patent No.: US 8,588,221 B2
(45) Date of Patent: Nov. 19, 2013

(54) METHOD AND INTERFACE FOR INTERFACING A RADIO FREQUENCY TRANSCEIVER WITH A BASEBAND PROCESSOR

(75) Inventors: Irene Schuster, Kronstorf (AT); Juergen Wahl, Gallneukirchen (AT)

(73) Assignee: Intel Mobile Communications GmbH, Neubiberg (DE)

( * ) Notice: Subject to any disclaimer, the term of this patent is extended or adjusted under 35 U.S.C. 154(b) by 221 days.

(21) Appl. No.: 13/269,064

(22) Filed: Oct. 7, 2011

(65) Prior Publication Data

US 2013/0089012 A1 Apr. 11, 2013

(51) Int. Cl.
*H04Q 11/00* (2006.01)

(52) U.S. Cl.
USPC .............................. 370/359; 370/419; 370/463

(58) Field of Classification Search
USPC ......... 370/329, 352, 359, 419, 463, 465–467, 370/469, 474; 714/746–799
See application file for complete search history.

(56) References Cited

U.S. PATENT DOCUMENTS

| 6,724,753 B2 * | 4/2004 | Edgar et al. ................... 370/352 |
| 2005/0083970 A1 * | 4/2005 | Glickman et al. ............ 370/466 |
| 2008/0186146 A1 | 8/2008 | Tripathi et al. |
| 2011/0075616 A1 * | 3/2011 | Baldwin et al. ................ 370/329 |

FOREIGN PATENT DOCUMENTS

WO 2011103922 A1 9/2011

OTHER PUBLICATIONS

DigRF(SM) Specifcations; http://www.mipi.org/specifications/digrfsm-specifications, p. 1-4, 2010.

* cited by examiner

*Primary Examiner* — Jeffrey M Rutkowski
*Assistant Examiner* — Harun Chowdhury
(74) *Attorney, Agent, or Firm* — Eschweiler & Associates, LLC

(57) ABSTRACT

An interface includes three sub-interfaces. A first and second sub-interface receive first/second inbound IQ data streams, respectively, packetize the first/second inbound IQ data streams to obtain first/second inbound IQ data packets, respectively, and transmit the first/second inbound IQ data packets to the baseband processor via a first/second set of RX lanes, respectively. Each first/second inbound IQ data packet comprises a data packet identifier out of a common set of possible data packet identifiers. A third sub-interface receives outbound IQ data packets from the baseband processor via a TX lane, and depacketizes the outbound IQ data packets to obtain an outbound IQ data stream. The third sub-interface receives an RX not-acknowledge signal via the TX lane that identifies a defective first or second inbound IQ data packet within the first/second inbound IQ data packets.

20 Claims, 14 Drawing Sheets

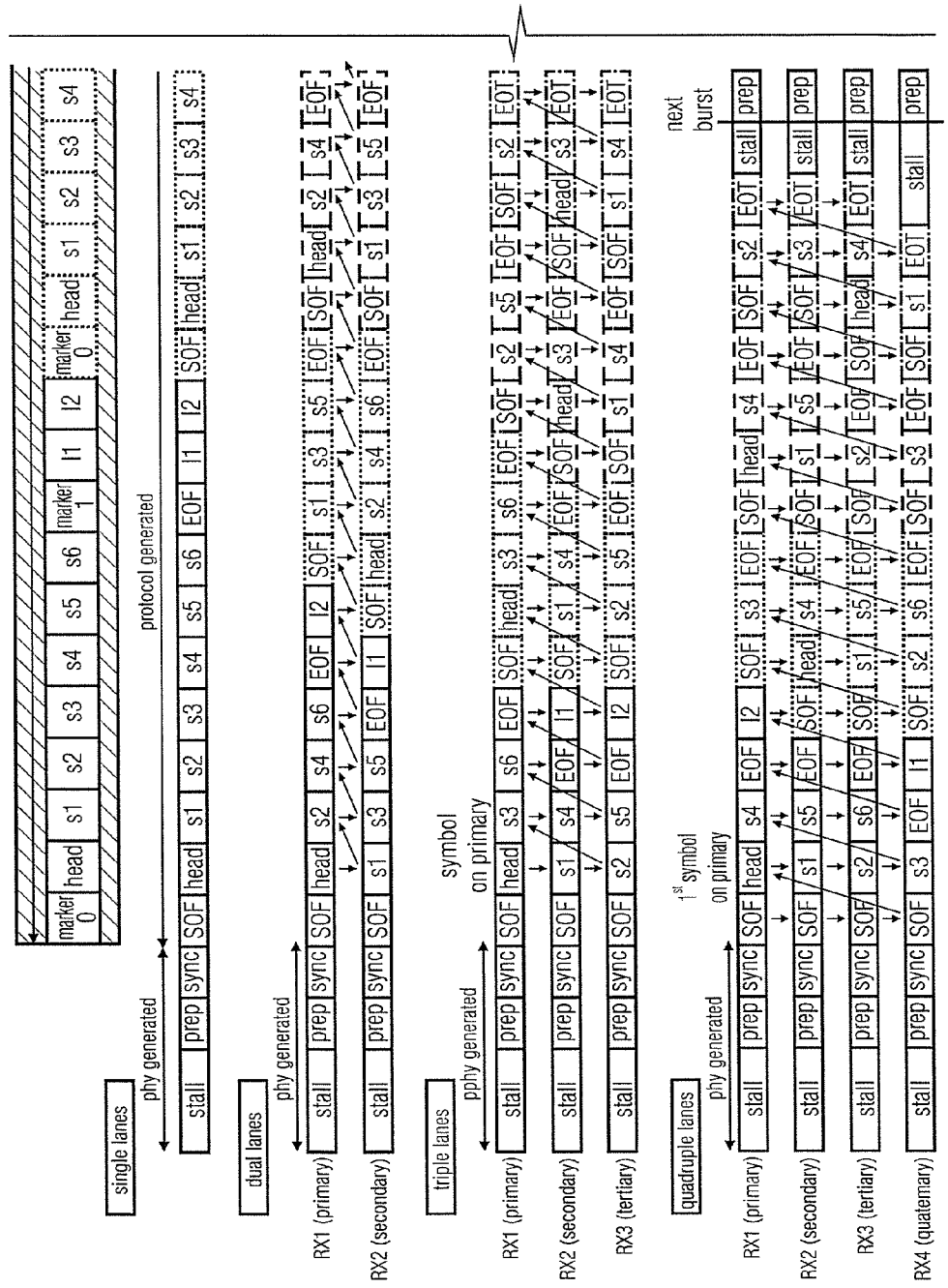

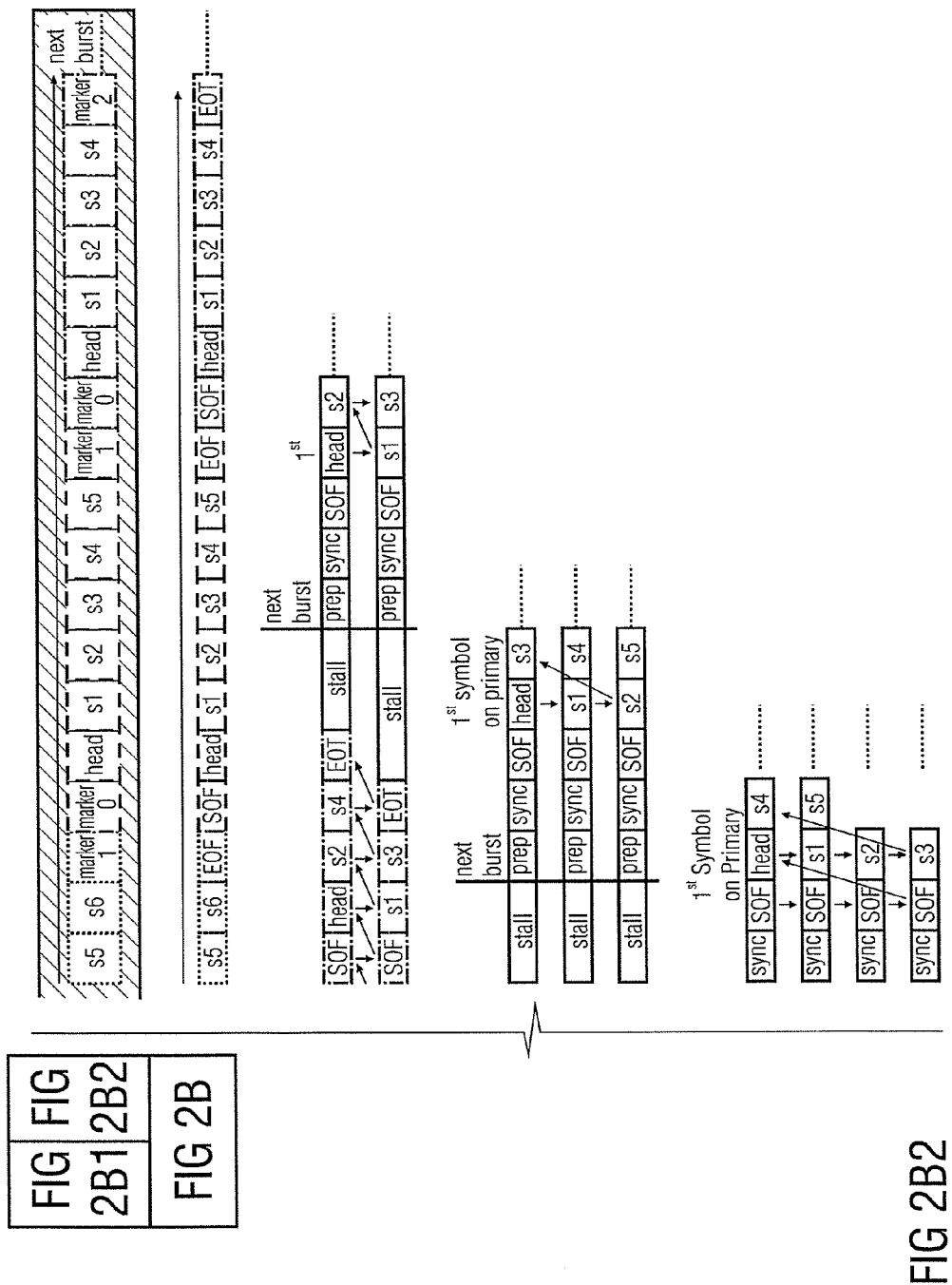
FIG 2B2

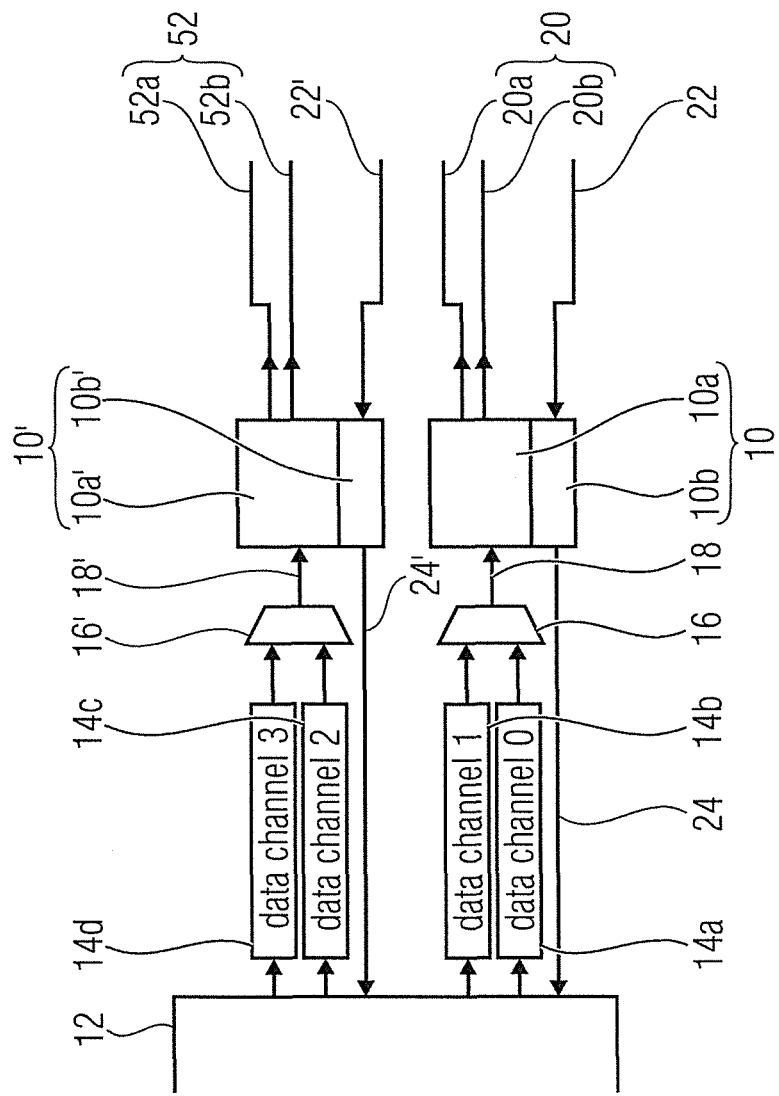

| Iden-tifier | Chan-nel | Trig-ger | Function | Arguments | |
|---|---|---|---|---|---|
| 08h | T | n/a | Configuration Trigger (TRG-T) This message shall be sent on the TxData Sublink to validate previously sent configuration TICLC messages for execution. As a response the Configuration Trigger Responce RICLC message shall be sent back on the RxData Sublink after reception of the Configuration Trigger. | 00h ... 3Ch 3Dh 3Eh ... FFh | Reserved for future use Reserved for future use Configuration Trigger Reserved for future use Reserved for future use |
| 09h | R | n/a | Configuration Trigger Response (TRG-R) This message shall be sent on the RxData Sublink in response to the Configuration Trigger (TRG-T) TICLC message. Execution of the previously programmed configuration changes shall be initiated in the RFIC after sending this message, while changes in the BBIC shall be initiated after successful receipt of this message. | 00h ... D2h D3h D4h ... FFh | Reserved for future use Reserved for future use Configuration Trigger Response Reserved for future use Reserved for future use |

FIG 5C1

| FIG 5C1 |
| FIG 5C2 |
| FIG 5C3 |

FIG 5C

| Iden-tifier | Chan-nel | Trig-ger | Function | Arguments |
|---|---|---|---|---|
| 10h | T | yes | Enable RxData Sublink<br>If enabled by BBIC, the RFIC shall enable the LD(s) on all configured Lanes of the RxData Sublink. | 00h Disable RxData Sublink Lane(s) (Lds Off)<br>01h Enable RxData Sublink Lane(s) (Lds On)<br>02h Reserved for future use<br>...<br>FFh Reserved for future use |

FIG 5C2

| FIG 5C | FIG 5C1 | FIG 5C2 | FIG 5C3 |
|---|---|---|---|

FIG 5C3

METHOD AND INTERFACE FOR INTERFACING A RADIO FREQUENCY TRANSCEIVER WITH A BASEBAND PROCESSOR

FIELD

Embodiments of the present invention refer to an interface for interfacing a radio frequency transceiver with a baseband processor, an interface for interfacing a baseband processor with a radio frequency transceiver as well as to a method and a computer program for interfacing a baseband processor and a radio frequency transceiver.

BACKGROUND

A radio frequency transceiver and a baseband processor are constitutive components of a radio interface of a mobile communication device, for example, a 3G mobile communication device. The radio frequency transceiver and baseband processor are usually connected via an interface, for example, the DigRF (Digital Radio Frequency) interface. This interface should transport inbound data received over the air, for example, from a base station of a mobile communication system (e.g. LTE (Long Term Evolution) or UMTS), by the radio frequency transceiver to the baseband processor and transport outbound data from the baseband processor to the radio frequency transceiver in order to transmit same data over the air, e.g. to the base station. Furthermore, the interface should transfer control data between the radio frequency transceiver and the baseband processor. The control data may comprise interface control data, control data for controlling the radio frequency transceiver, error or status messages (e.g. data rate or signal strength indicator) and/or control signals which should be exchanged between the radio frequency transceiver and the baseband processor.

Such interfaces are typically standardized in order to reduce design resource requirements and speed up the time to market of a mobile communication device. A common standard for the interface between the radio frequency transceiver and the baseband processor is the specification for the DigRF v4 interface which is standardized by the MIPI organization.

SUMMARY

Embodiments of the invention provide an interface for interfacing a radio frequency transceiver with a baseband processor. The interface comprises a first sub-interface configured to receive a first inbound IQ data stream, packetize the first inbound IQ data stream to obtain first inbound IQ data packets, and transmit the first inbound IQ data packets to the baseband processor via a first set of RX lanes, wherein each first inbound IQ data packet comprises a data packet identifier out of a common set of possible data packet identifiers. The interface comprises a second sub-interface configured to receive a second inbound IQ data stream, packetize the second inbound IQ data stream to obtain second inbound IQ data packets, and transmit the second inbound IQ data packets to the baseband processor via a second set of RX lanes, wherein each second inbound IQ data packet comprises a data packet identifier out of the common set of possible data packet identifiers. The interface further comprises a third sub-interface configured to receive outbound IQ data packets from the baseband processor via a TX lane, and depacketize the outbound IQ data packets to obtain an outbound IQ data stream, wherein the third sub-interface is configured to further receive an RX not-acknowledge signal from the baseband processor via the TX lane, wherein the RX not-acknowledge signal identifies a defective first or second inbound IQ data packet within the first and second inbound IQ data packets by indicating the data packet identifier of the defective first or second inbound IQ data packet and the first or second set of RX lanes via which the defective first or second inbound IQ data packet is transmitted.

A further embodiment provides an interface for interfacing a baseband processor with a radio frequency transceiver. The interface comprises a first sub-interface configured to receive first inbound IQ data packets from the radio frequency transceiver via a first set of RX lanes, perform a forward error detection in order to identify a defective first inbound IQ data packet within the first inbound IQ data packets, and output a first RX not-acknowledge signal identifying the defective first inbound IQ data packet by indicating the data packet identifier of the defective first inbound IQ data packet and the first set of RX lanes via which the defective first inbound IQ data packet is received. The interface comprises a second sub-interface configured to receive second inbound IQ data packets from the radio frequency transceiver via a second set of RX lanes, perform a forward error detection in order to identify a defective second inbound IQ data packet within the second inbound IQ data packets, and output a second RX not-acknowledge signal identifying the defective second inbound IQ data packet by indicating the data packet identifier of the defective second inbound IQ data packet and the second set of RX lanes via which the defective second inbound IQ data packet is received. The interface further comprises a third sub-interface configured to transmit outbound IQ data packets to the radio frequency transceiver via a TX lane, and transmit the RX not-acknowledge signal to the radio frequency transceiver via a TX lane.

A further embodiment provides a method for interfacing a radio frequency transceiver with a baseband processor. The method comprises a first step of receiving a first inbound IQ data packet, packetizing the first inbound IQ data stream to obtain first inbound IQ data packets and transmit the first inbound IQ data packets to the baseband processor via a first set of RX lanes of a first sub-interface, wherein each first inbound IQ data packet comprises a data packet identifier out of a common set of possible data packet identifiers. The method comprises a second step of receiving a second inbound IQ data stream, packetizing the second inbound IQ data stream to obtain second inbound IQ data packets, and transmitting the second inbound IQ data packets to the baseband processor via a second set of RX lanes of a second sub-interface, wherein each second inbound IQ data packet comprises a data packet identifier out of a common set of possible data packet identifiers. The method further comprises a third step of receiving outbound IQ data packets from the baseband processor via a TX lane of a third sub-interface, and depacketizing the outbound IQ data packets to obtain an outbound IQ data stream, while receiving an RX not-acknowledged signal from the baseband processor via the TX lane of the third sub-interface, wherein the RX not-acknowledge signal identifies a defective first or second inbound IQ data packet within the first and second inbound IQ data packets by indicating the data packet identifier of the defective first or second inbound IQ data packet and the first or second set of RX lanes via which the defective first or second inbound IQ data packet is transmitted.

A further embodiment provides a method for interfacing a baseband processor with a radio frequency transceiver. The method comprises a first step of receiving first inbound IQ data packets from the radio frequency transceiver via a first set of RX lanes of a first sub-interface, performing a forward error detection in order to identify a defective first inbound IQ data packet within the first inbound IQ data packets, and outputting a first RX not-acknowledge signal identifying the defective first inbound IQ data packet by indicating the data packet identifier of the defective first inbound IQ data packet and the first set of RX lanes via which the defective first inbound IQ data packet is received. The method further comprises a second step of receiving second inbound IQ data packets from the radio frequency transceiver via a second set of RX lanes of a second sub-interface, performing a forward error detection in order to identify a defective second inbound IQ data packet within the second inbound IQ data packets, and outputting a second RX not-acknowledge signal identifying the defective second inbound IQ data packet by indicating the data packet identifier of the defective second inbound IQ data packet and the second set of RX lanes via which the defective second inbound IQ data packet is received. The method further comprises a third step of transmitting outbound IQ data packets to the radio frequency transceiver via a TX lane of a third sub-interface, while transmitting the RX not-acknowledge signal to the radio frequency transceiver via a TX lane of the third sub-interface.

A further embodiment provides a computer readable digital storage medium having stored thereon a computer program having a program code for performing, when running on a computer, a method for interfacing a baseband processor with a radio frequency transceiver. The method comprises a first step of receiving a first inbound IQ data stream, packetizing the first inbound IQ data stream to obtain first inbound IQ data packets, and transmitting the first inbound IQ data packets to the baseband processor via a first set of RX lanes of a first sub-interface, wherein each first inbound IQ data packet comprises a data packet identifier out of a common set of possible data packet identifiers. The method comprises a second step of receiving a second inbound IQ data stream, packetizing the second inbound IQ data stream to obtain second inbound IQ data packets, and transmitting the second inbound IQ data packets to the baseband processor via a second set of RX lanes of a second sub-interface, wherein each second inbound IQ data packet comprises a data packet identifier out of the common set of possible data packet identifiers. The method further comprises a third step of receiving outbound IQ data packets to obtain an outbound IQ data stream, while receiving an RX not-acknowledge signal from the baseband processor via the TX lane of the third sub-interface, wherein the RX not-acknowledge signal identifies a defective first or second inbound IQ data packet within the first and second inbound IQ data packets by indicating the data packet identifier of the defective first or second inbound IQ data packet and the first or second set of RX lanes via which the defective first or second inbound IQ data packet is transmitted.

BRIEF DESCRIPTION OF THE DRAWINGS

In the following, embodiments of the invention will be described referring to the drawings.

FIG. 2b exemplarily shows a timing diagram for illustrating a principle of multilane usage and byte stripping;

FIG. 3 exemplarily shows a block diagram of a two parallel standard interfaces of a radio frequency transceiver enabling an increased data rate;

FIG. 5c schematically shows a table of interface communication signals according to an embodiment.

DETAILED DESCRIPTION

Figure 1A:
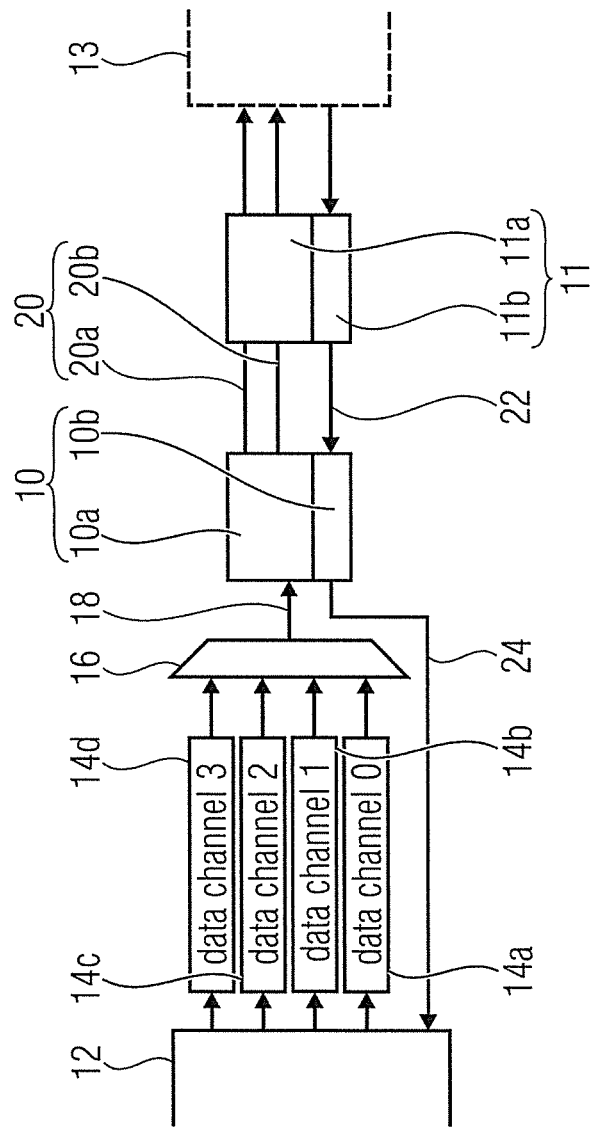
FIG. 1a exemplarily shows a block diagram of a standard interface of a radio frequency transceiver and of a baseband processor.

Different embodiments of the invention will subsequently be discussed referring to FIG. 1a to FIG. 5c. In advance, identical reference numerals are provided to objects having identical or similar functions so that objects referred to by identical reference numerals within the different embodiments are interchangeable and the description thereof is mutually applicable.

Referring to FIG. 1a to FIG. 3, a state of the art implementation of an interface between a radio frequency transceiver and a baseband processor and especially the functionality of such interfaces will be discussed. The interface, namely the DigRF v4 (Digital Radio Frequency) interface, is standardized by the MIPI organization. Due to the standardization of the interface, features of same, for example a data rate or a bandwidth (e.g. 20 MHz), are limited. Future applications, for example LTE (Longer Term Evolution), will require an increased data rate and thus an increased bandwidth, for example 40 MHz. The MIPI standard basically offers two different solutions for increasing the bandwidth, which will be discussed referring to FIGS. 2a and 2b.

FIG. 1a shows internal interfaces of a radio frequency transceiver 12 and a baseband processor 13, namely an interface 10 of the radio frequency transceiver 12 for interfacing same with the baseband processor 13 or in more detail with its interface 11. The interface 11 of the baseband processor 13 is the matching interface to the interface 10 of the radio frequency transceiver 12. The two interfaces 10 and 11 are electrically connected via a plurality of pins, for example seven pins. This plurality of pins forms several lanes comprising a system clock, a TX lane and a set of RX lanes. The interfaces 10 and 11 comprise first sub-interfaces 10a and 11a for inbound IQ data (downlink) and second sub-interfaces 10b and 11b for outbound IQ data (uplink). The first sub-interface 10a is connected with the radio frequency transceiver 12 via at least one of the shown four RX data channels 14a, 14b, 14c and 14d, an optional multiplexer 16 and a single RX data channel 18. The first sub-interface 10a of the radio frequency transceiver 12 is connected with the first sub-interface 11a of the baseband processor 13 via a first set of RX lanes 20. The first set of RX lanes 20 may comprise two RX lanes 20a and 20b. The second sub-interface 10b of the radio frequency transceiver 12 is connected with same via a TX data channel 24, wherein the second sub-interface 10b of the radio frequency transceiver 12 and the second sub-interface 11b of the baseband processor are connected via a TX lane 22.

Below, the functionality focused on a reception of inbound IQ data (downlink) will be discussed. The radio frequency transceiver 12 receives inbound RF signals, for example 3G communication signals, modulated on a carrier, e.g. a 5 GHz carrier, via one or more antennas and performs a preprocessing of the inbound RF signals to obtain one or more IQ data streams. The radio frequency transceiver may comprise a mixer, an amplification stage, a lowpass filter, an IQ demodulator and an analog-to-digital converter for preprocessing the inbound RF signals. The IQ demodulation may be performed prior or subsequent to the analog-to-digital conversion. After the preprocessing, IQ samples resulting from the RF signals form the IQ data stream. The one or more inbound IQ data streams which represent real and imaginary components are transmitted via one or more RX data channels 14a, 14b, 14c and/or 14d to the optional multiplexer 16. The optional multiplexer 16 may multiplex the plurality of inbound IQ data streams of the plurality of the four RX data channels 14a, 14b, 14c and 14d to a single inbound IQ data stream and outputs same via the single RX data channel 18. In other words, the multiplexer 16 is configured to serialize the parallel inbound IQ data streams of the parallel RX data channels 14a, 14b, 14c and 14d into the single inbound IQ data stream. The first sub-interface 10a receives the single inbound IQ data stream, packetizes same to obtain inbound IQ data packets and transmits same to the first sub-interface 11a of the baseband processor 13 via the first set of RX lanes 20, namely 20a and 20b. The packetizing is performed by using a standardized interface protocol of the first sub-interface 10a, wherein the inbound IQ data stream may be sampled to obtain a plurality of inbound IQ data packets for outputting same to the baseband processor 13. Each inbound IQ data packet has a header comprising a checksum, a data packet identifier, information on a packet type and/or on a payload. The single inbound IQ data packets may be transmitted via the first RX lane 20a or the second RX lane 20b or via both RX lanes 20a and 20b. The first sub-interface 11a of the baseband processor 13 receives the inbound IQ data packets and may perform a forward error detection in order to identify defective inbound IQ data packets caused by a transmission error. The proper transmitted inbound IQ data packets may be processed by an OFDM (Orthogonal Frequency Division Multiplexing) unit including, for example, a FFT (Fast Fourier Transformation) module and, optionally, a channel estimator or corrector in order to output a symbol data which corresponds to the originally sent binary data stream before transmitting same over a radio interface (e.g. from the base station to the mobile communication device) via, for example, specific modulation schemata (e.g. modulation, constellation).

Below, the functionality focused on a transmission of outbound IQ data (uplink) will be discussed. In order to transmit data from the mobile communication device, for example, to the base station of the communication system, the outbound IQ data packets are transmitted from the baseband processor 13 to the radio frequency transceiver 12 via the two second sub-interfaces 10b and 11b. Here, the outbound IQ data packets are transmitted from the baseband processor 13 and its second sub-interface 11b to the second sub-interface 10b of the radio frequency transceiver 12 via the TX lane 22. The second sub-interface 10b receives the outbound IQ data packets and depacketizes same to obtain an outbound IQ data stream. This outbound IQ data stream is received by the radio frequency transceiver 12 via the TX data channel 24 and transmitted over the air, for example, to the base station after some post-processing steps, like digital-to-analog converting, etc.

The outbound IQ data packets and the outbound IQ data stream, respectively, are transmitted just via one TX lane 22 and one TX data channel 24 because the data rate of the uplink (outbound data) is typically smaller than the data rate of the downlink (inbound data). Such an interface 10 or 11 enables different normal interface modes, for example a low speed mode having an interface data rate of 26, 38.4 or 52 Mbps, two different high speed 1× modes having a data rate between 1248 Mbps and 1459.2 Mbps as well as two optional high speed 2× interface modes having a data rate between 2496 and 2918.4 Mbps. For these five interface modes, a reference frequency of the interface of, for example, 26, 38.4 or 52 MHz is typically used. This illustrated state of the art implementation of the interfaces 10 and 11 uses an interface frequency of 1248 MHz or 1456 MHz for the two RX lanes 20a and 20b and for the TX lane 22.

Below, an autonomous repeat request (ARQ) mechanism will be discussed. Here, the first sub-interface 11a performs the forward error detection for detecting defective inbound IQ data packets within the inbound IQ data packets by using the checksum. In order to induce a retransmission of the defective inbound IQ data packets, the first sub-interface 11a outputs an RX not-acknowledge signal corresponding to an information on transmission errors, when detecting the transmission error. This RX not-acknowledge signal is transmitted from the first sub-interface 11a of the baseband processor 13 to the first sub-interface 10a of the radio frequency transceiver 12 via the TX lane 22 and thus via the second sub-interfaces 11b and 10b. Therefore, the first sub-interfaces 10a and 11a are connected to the second sub-interfaces 10b and 11b via a TX not-acknowledge control logical channel for transmitting the RX not-acknowledge signal. The first sub-interface 10a of the radio frequency transceiver 12 may comprise a buffer configured to buffer a portion of the inbound 10 data stream and to retransmit the portion of the inbound IQ data stream, when the retransmission of the respective inbound IQ data packet is induced by the RX not-acknowledge signal. The single defective inbound IQ data packet may be clearly identified by the data packet identifier (within the header) which is transmitted together with the RX not-acknowledge signal. In order to distinguish via which RX lane 20a or 20b the defect inbound IQ data packet is transmitted the RX not-acknowledge signal includes among with the data packet identifier an RX lane indicator.

Analogously, the second sub-interface 10b of the radio frequency transceiver 12 may perform a forward error detection in order to identify defective outbound IQ data packets according to the forward error detection of the first sub-interface 11a and to indicate the defective outbound IQ data packet by a TX not-acknowledge signal. The TX not-acknowledge signal corresponds to the RX not-acknowledge signal but is output by the second sub-interface 10b of the radio frequency transceiver 12 when identifying a defective outbound IQ data packet within the outbound 10 data packets. The second sub-interface 11b of the baseband processor 13 comprises a buffer configured to buffer a portion of the outbound IQ data stream, and retransmit the portion of the outbound IQ data stream as buffered in accordance with the TX not-acknowledge signal received via the first sub-interface 10a and a so-called RX not-acknowledge control logical channel connecting the first and second sub-interfaces 10a and 10b as well as 11a and 11b.

Figure 1B:
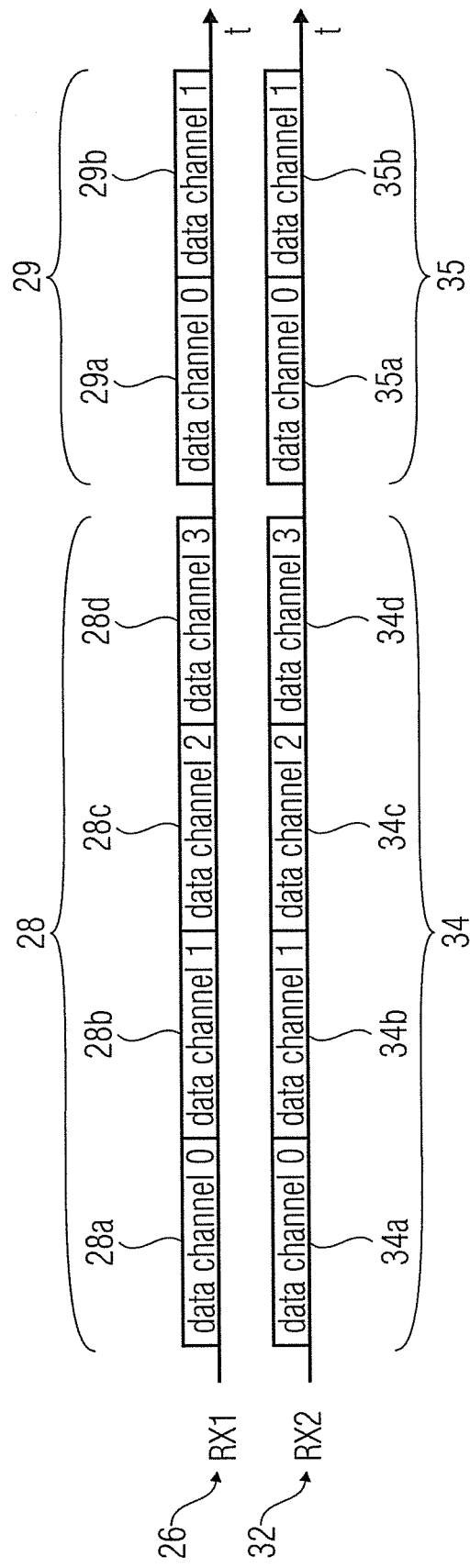
FIG. 1b exemplarily shows a timing diagram of data packets for illustrating data multiplexing.

FIG. 1b illustrates the principle of multiplexing. Here, four inbound IQ data streams are received via four parallel RX data channels and transmitted via two parallel RX lanes, after multiplexing the four inbound IQ data streams to obtain a single inbound IQ data stream and packetizing same to inbound IQ data packets. The transmission of the inbound IQ data packets transmitted via the first RX lane and the transmission of the inbound IQ data packets transmitted via the second RX lane take place in parallel, wherein singular portions of the inbound IQ data stream packetized to inbound IQ data packets for transmitting same via the first or second RX lane are transmitted serially. FIG. 1b shows a timing diagram 26 of a serial data transmission via the first RX lane 20a, and a timing diagram 32 of a serial data transmission via the second RX lane 20b. The timing diagram 26 of the first RX lane shows that the first transmitted inbound IQ data packet 28 comprises four portions 28a, 28b, 28c and 28d of the inbound IQ data stream, wherein the first portion 28a is received via the first RX data channel 14a, the second portion 28b via the second RX data channel 14b, the third portion 28c via the RX data channel 14c and the fourth portion 28d via the fourth RX data channel 14d. The second inbound IQ data packet 29 comprises two portions of the inbound IQ data stream 29a (received via the first RX data channel 14a) and 29b (received via the second RX data channel 14b). The timing diagram 32 of the second RX lane illustrates the transmission of a first inbound IQ data packet 34 and the transmission of a second inbound IQ data packet 35, wherein the first inbound IQ data packet 34 comprises four portions 34a, 34b, 34c and 34d of the inbound IQ data stream received via the four RX data channels 14a, 14b, 14c and 14d, while the second inbound IQ data packet 35 comprises two portions 35a and 35b of the inbound IQ data stream received via the two RX data channels 14a and 14b. The respective portions of the inbound IQ data stream 28a, 28b, 28c and 28d transmitted via the first RX lane differ from the respective portions of the inbound IQ data stream 34a, 34b, 34c and 34d transmitted via the second RX lane. Analogously, the portions of the inbound IQ data stream 29a and 29b are different from the portions of inbound IQ data stream 35a and 35b. It should be noted that the single RX data channels are not mapped to dedicated RX lanes, but every RX data channel is distributed over all active RX lanes as illustrated in the following.

The four portions of the inbound IQ data stream 28a, 28b, 28c and 28d are transmitted in series via the first RX lane. That is that the transmission of the second portion of the inbound IQ data stream 28b starts after transmitting the first portion of the inbound IQ data stream 28a is transmitted, etc. Furthermore, the second inbound IQ data packet 29 is transmitted after the transmission of the first inbound IQ data packet 28 is finished, wherein the transmission of the two inbound IQ data packets 28 and 29 may be interrupted by a short transmission break. The transmission of the two data packets 34 and 35 via the second RX lane takes place simultaneously to the transmission of the two data packets 28 and 29 via the first RX lane. Referring to FIG. 1a, due to the parallel transmission of the two data packets 28, and 34 as well as of the two data packets 29 and 35 via a plurality of parallel RX lanes 20a and 20b the data rate from the first sub-interface 10a of the radio frequency transceiver 12 to the first sub-interface 11a of the baseband processor 13 is increased compared to the transmission via just one RX lane 20a or 20b. The illustrated mode of the interface having two active RX lanes 20a and 20b corresponds to the high speed 2× mode of the interface which enables a data rate of above 2 Gbit/s. However, the inbound IQ data stream received by the single RX data channel 18 is transmitted as inbound IQ data packets via the two RX lanes 20a and 20b. So, the maximum data rate through the single RX data channel 18, for example 4.66 Gbit/s, is doubled compared to the maximum data rate through the RX lanes 20a and 20b, for example, 2.33 Gbit/s. Due to the multiplexing performed by the multiplexer 16 the data rate through each RX data channel 14a, 14b, 14c and 14d is equal to the data rate through the single RX data channel 18 because of the serializing of the plurality of inbound IQ data streams. So, this solution for increasing the bandwidth causes high implementation effort on the physical layer of the interface 10 and 11. As a consequence of the byte stripping, each data buffer needs to be capable of providing the full data rate of 4.66 Gbit/s at the buffer.

Figure 2A:
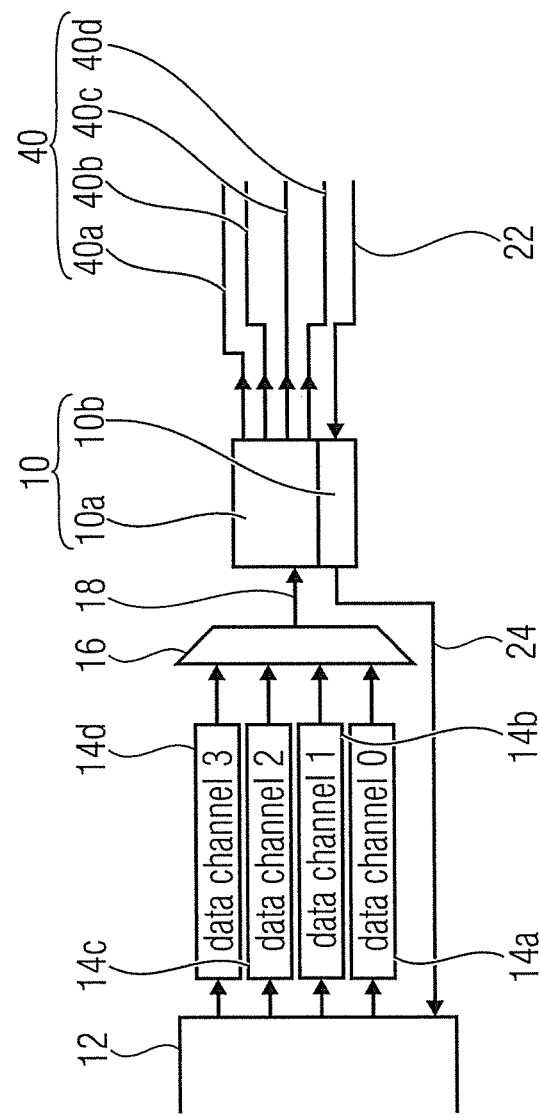
FIG. 2a exemplarily shows a block diagram of a standard interface of a radio frequency transceiver enabling an increased data rate due to multilane usage.

FIG. 2a shows an interface 10 of the radio frequency transceiver 12 which complies with the interface 10 according to FIG. 1a. In contrast to the interface shown in FIG. 2a, the number of RX lanes between the first sub-interface 10a of the radio frequency transceiver 12 and the first sub-interface of the baseband processor is increased. Therefore, a set of RX lanes 40 comprises four RX lanes 40a, 40b, 40c and 40d via which the inbound IQ data packets are transmitted. Here, the first sub-interface 10a receives the inbound IQ data stream via the single RX data channel 18, packetizes same to obtain inbound IQ data packets, and transmits the inbound IQ data packets distributed among the four RX lanes 40a, 40b, 40c and 40d to the baseband processor (not shown). The distribution of the inbound IQ data packets is called byte stripping and will be discussed with reference to FIG. 2b. Due to the four RX lanes 40a, 40b, 40c and 40d the maximum data rate per RX lane is quartered compared to the maximum data rate through the single RX data channel 18. For example, if the data rate through each RX data channel 14a, 14b, 14c and 14d and thus through the single RX data channel 18 amounts to 4.66 Gbit/s the data rate through each RX lane 40a, 40b, 40c and 40d amounts to 1.16 Gbit/s. This solution for increasing the interface data rate by adding additional RX lanes 40c and 40d corresponds to an increase of the bandwidth of the interface 10.

FIG. 2b shows for different modes of transmission of a plurality 42 of inbound IQ data packets 42a, 42b, 42c and 42d by using data multiplexing or byte stripping over 2, 3 or 4 RX lanes. Here, the first inbound IQ data packet 42a comprises eleven symbols, wherein the first symbol is a marker indicating the start of frame (SOF) and the second symbol is the header. The last two symbols are additional symbols that are separated from the other eight symbols by a further marker indicating the end of frame (EOF). The second inbound IQ data packet 42b comprises nine symbols, wherein the first symbol is the start of a frame (SOF) marker, the second symbol the header and the last symbol the end of frame (EOF) marker. Analogously, the third inbound IQ data packet 42c comprises eight symbols and the fourth inbound IQ data packet 42d seven symbols, wherein each inbound IQ data packet 42b and 42c comprises the start of frame (SOF) symbol, the header and the end of frame (EOF) symbol.

The transmission diagram 44 illustrates a transmission mode via a single RX lane. Here, the four inbound IQ data packets 42a, 42b, 42c and 42d are transmitted in series (cf. Protocol generated), wherein the transmission begins with an initialization sequence comprising three symbols for preparing the transmission and synchronizing the two sub-interfaces of the radio frequency transceiver and the baseband processor between which the data should be transmitted. The length of the transmission burst of this transmission mode is equal to the length of the four inbound IQ data packets 42a, 42b, 42c and 42d, but is extended due to the initialization sequence (cf. Phy generated).

The transmission diagram 46 illustrates a transmission mode via two RX lanes. Here, the transmission via each RX lane begins with the initialization sequence before transmitting the four inbound IQ data packets 42a, 42b, 42c and 42d. The first symbol after transmitting the start of frame (SOF) symbol transmitted via both RX lanes is the header which is transmitted via the first RX lane. Contemporaneously, the transmission of the next symbol takes place via the second RX lane. After transmitting these two symbols, the fourth symbol is transmitted via the first RX lane, while the fifth symbol is transmitted via the second RX lane. By using this principle of an alternating transmission via a plurality of RX lanes, the transmission of the further symbols of the first inbound IQ data packet 42a as well as of the symbols of the second, third and fourth inbound IQ data packets 42b, 42c and 42d takes place. In other words, the transmission of the four inbound IQ data packets 42a, 42b, 42c and 42d is based on a parallel transmission via two RX lanes wherein the single symbols are transmitted on a rotating basis via the first and the second RX lanes. It should be noted that the start of frame (SOF) symbol and end of frame (EOF) symbol of the four inbound IQ data packets 42a, 42b, 42c and 42d are transmitted via both RX lanes. Furthermore, a so called stall symbol is transmitted at the end of each transmission burst, wherein the stall symbol of the first and second RX lanes may have a different length in order to transmit two transmission bursts of equal length. Due to the parallel transmission of the four inbound IQ data packets 42a, 42b, 42c and 42d the length of the transmission bursts is smaller compared to the transmission bursts of a single RX lane transmission as illustrated in the transmission diagram 44.

The transmission diagram 48 illustrates a transmission of the four inbound IQ data packets 42a, 42b, 42c and 42d via three RX lanes. Here, the transmission takes place by using three RX lanes so that three symbols are transmitted in parallel. Analogously to the transmission via two RX lanes, an initialization sequence, the start of frame (SOF) symbol and the end of frame (EOF) symbol as well as the stall symbol are transmitted via all three RX lanes. The transmission mod using three RX lanes enables a length of the transmission burst which is reduced compared to the transmission burst of the transmission diagram 46 or 44. The transmission burst may be further reduced by using four RX lanes as illustrated by the transmission diagram 50. Here, the transmission of the four inbound IQ data packets 42a, 42b, 42c and 42d takes place by using four RX lanes (cf. set of RX lanes 40, FIG. 2a) and transmitting four symbols of the bound IQ data packets 42a, 42b, 42c and 42d in parallel.

Referring to FIG. 2a, the transmission of the inbound IQ data packets via the four RX lanes 40a, 40b, 40c and 40d enables an increased bandwidth between the sub-interface 10a of the radio frequency transceiver 12 and the sub-interface of the baseband processor (not shown). However, this solution causes additional implementation effort compared to the state of the art implementation consisting of two RX lanes due to the need for an adaption of the physical layer 40a, 40b, 40c and 40d. This increases the costs of the interface 10 and 11 and especially of the hardware which is responsible for spreading and combining the data across or from the plurality of RX lanes. Furthermore, the needed data rate through the single RX data channel 18 and thus through the protocol layer of the sub-interface 10a is not reduced. Therefore, the protocol layer has to be adapted for being capable of providing the data throughput. In addition, the high data rate is also needed at the interfaces between the buffers of the sub-interface 10a and the protocol layer. In other words, the downlink data buffers have to be capable of providing a quad maximum data rate, e.g. of 4.666 Gbit/s, in parallel data format according to the used clock rate when compared to the maximum data rate through each RX lane 40a, 40b, 40c and 40d, e.g. of 1.16 Gbit/s.

Further solutions for increasing the data rate are to increase the interface frequency, for example, from 1248 MHz to 2896 MHz or to implement two separate interfaces on one chip, as illustrated below. FIG. 3 shows a first interface 10 that is equal to the interface 10 according to FIG. 1a, wherein the sub-interface 10a receives the inbound IQ data stream from the radio frequency transceiver 12 via two RX data channels 14a and 14b. Parallel to the interface 10, a further interface 10' is arranged. This interface 10' comprises a first sub-interface 10a' and a second sub-interface 10b'. The sub-interface 10a' of the radio frequency transceiver 12 receives the inbound IQ data stream via the third and fourth RX data channels 14c and 14d, an optional multiplexer 16' and a single RX data channel 18'. The first sub-interface 10a' transmits the packetized inbound IQ data packets to the baseband processor (not shown) via a second set 52 of RX lanes comprising two RX lanes 52a and 52b. The interface 10' further comprises the second sub-interface 10b' configured to transmit outbound IQ data packets and outbound IQ data streams, respectively. The second sub-interface 10b' receives the outbound IQ data packets via the TX lane 22' and transmits same via the TX data channel 24' to the radio frequency transceiver 12.

Regarding functionality, the second parallel interface 10' is equal to the first interface 10 as discussed with respect to FIG. 1a. This solution enables a high bandwidth by a reduced data throughput through each RX lane 20a, 20b, 52a and 52b of the first set of RX lanes 20 and of the second set 52 of RX lanes as well as high bandwidth by a reduced data throughput through the RX data channels 14a, 14b, 14c and 14d and thus through the single RX data channels 18 and 18'. For example, if the maximum data rate through each of the RX lanes 20a, 20b, 52a and 52b amounts to 1.16 Gbit/s, the maximum data rate through each of the RX data channels 14a, 14b, 14c and 14d and through each of the single RX data channels 18 and 18' amounts to 2.33 Gbit/s. Thus, this option increases the data rate through the entire interface 10 from the radio frequency transceiver 12 to the baseband processor. It should be noted that the additional TX lane 22' as well as the additional TX data channel 24' are basically not needed due to data rate requirements. This option for increasing the data rate through the interface between the radio frequency transceiver 12 and the baseband processor causes an increased pin count and an increased current consumption. Therefore, there is the need for an improved approach for interfacing the radio frequency transceiver 12 and the baseband processor.

Figure 4A:
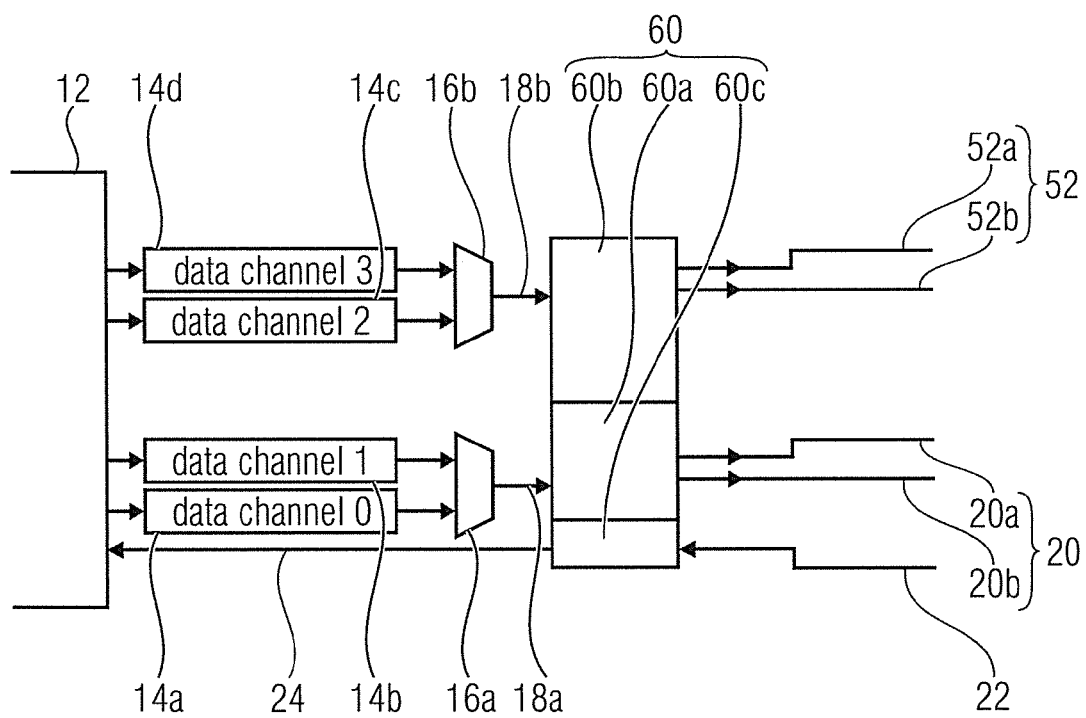
FIG. 4a exemplarily shows a block diagram of an interface of a radio frequency transceiver for interfacing a baseband processor according to an embodiment.

FIG. 4a shows an improved approach for such an interface. FIG. 4a shows an interface 60 of the radio frequency transceiver 12 for interfacing same with the baseband processor (not shown). The interface 60 comprises a first and a second sub-interface 60a and 60b for the downlink (inbound IQ data) and a third sub-interface 60c for the uplink (outbound IQ data). In other words, the interface 60 comprises a first sub-interface unit, also referred to as master sub-interface unit, comprising the sub-interface 60a and 60c for transmitting inbound and outbound IQ data, wherein the first sub-interface unit is similar to the interface 10 according to FIG. 1a, and a second sub-interface unit, also referred to as slave sub-interface unit, comprising the sub-interface 60b for transmitting inbound IQ data. The first sub-interface 60a is configured to receive a first inbound IQ data stream via at least one of the RX data channels 14a and 14b and a single RX data channel 18a, packetize same to obtain first inbound IQ data packets, and transmit same packets to the baseband processor via the first set 20 of RX lanes comprising two RX lanes 20a and 20b.

Analogously, the second sub-interface 60b is configured to receive a second inbound IQ data stream via at least one of the RX data channels 14c and 14d and a single RX data channel 18b, packetize same to obtain second inbound IQ data packets, and transmit same packets to the baseband processor via the second set 52 of RX lanes comprising two RX 52a and 52b. The third sub-interface is configured to receive outbound IQ data packets from the baseband processor via the TX lane 22, and depacketize same packets to obtain an outbound IQ data stream which is transmitted to the radio frequency transceiver 12 via the TX data channel 24. The functionality of the first and second sub-interface 60a and 60b as well as the functionality of the third sub-interface 60c comply substantially with the respective sub-interface 10a or 10b of FIG. 1a, wherein all three sub-interfaces 60a, 60b and 60c are electrically connected to each other in order to exchange interface control signals, RX and/or TX not-acknowledge signals.

The RX not-acknowledge signal, which is output by a forward error detection of a first or second sub-interface of the baseband processor, identifies a defective first or second inbound IQ data packet within the first and second inbound IQ data packets by indicating the data packet identifier of the defective first or second inbound IQ data packet. These data packet identifiers out of a common set of possible data packet identifiers are primarily transmitted from the first and second sub-interfaces 60a and 60b of the radio frequency transceiver 12 to the sub-interfaces of the baseband processor together with the first and second inbound IQ data packets. So, each first and second inbound IQ data packet is identifiable by the data packet identifier within the first IQ data packets or within the second inbound IQ data packets. In order to distinguish via which set, 20 or 52, of RX lanes the defective first or second inbound IQ data packet is transmitted and thus which of the transmitted first or second inbound IQ data packets is incorrectly transmitted, the forward error detection of the first and/or second sub-interface of the baseband processor returns the RX not-acknowledge signal including the data packet identifier and an indicator of the first or second set 20 or 52 of RX lanes (via which the defective first or second inbound IQ data packet is transmitted). The RX not-acknowledge signal is transmitted via the TX lane 22 and via a third sub-interface of the baseband processor to the interface 60. The RX not-acknowledge signal received by the third sub-interface 60c is forwarded to the first or second sub-interface 60a or 60b depending on the RX lane indicator of the RX not-acknowledge signal.

The first and second sub-interfaces 60a and 60b may be configured to packetize their respective first and second inbound IQ data packets separately and in parallel. Due to the parallel transmission of the inbound IQ data packets, their bandwidth and thus the maximum possible data rate are increased. It is advantageous that the maximum data rate through the single RX data channels 18a and 18b and through each RX data channel 14a, 14b, 14c and 14d amounts to maximum 2.33 Gbit/s when the data rate through each RX lane 20a, 20b, 52a and 52b amounts to 1.16 Gbit/s. Another advantage is that the forward error detection, also referred to as error recovery capability by using Autonomous Repeat Request (ARQ) which is defined by the MIPI standard stays the same as for the state of the art implementation. Furthermore, the interface 60 is based on a maximum reuse of the state of the art implementation so that the upwards and downwards compatibility of the interface 60 is ensured. It should be noted that the RX control signals including the radio frequency control signals, e.g. a received signal strength indicator (RSSI), are transmitted to the baseband processor via the first sub-interface 60a.

According to a further embodiment, a first sub-interface 60a may comprise a first multiplexer 16a configured to multiplex a plurality of inbound IQ data streams, received via a plurality of RX data channels 14a and 14b, to the first inbound IQ data stream output via a first single RX data channel 18a. Analogously, the second sub-interface 60b may comprise a second multiplexer 16b configured to multiplex a plurality of inbound IQ data streams, received via a plurality of RX data channels 14c and 14d, to the second inbound IQ data stream output via the second single RX data channel 18b. According to another embodiment, the interface of the baseband processor may be connected with a QFDM unit, as discussed with respect to FIG. 1a.

Figure 4B:
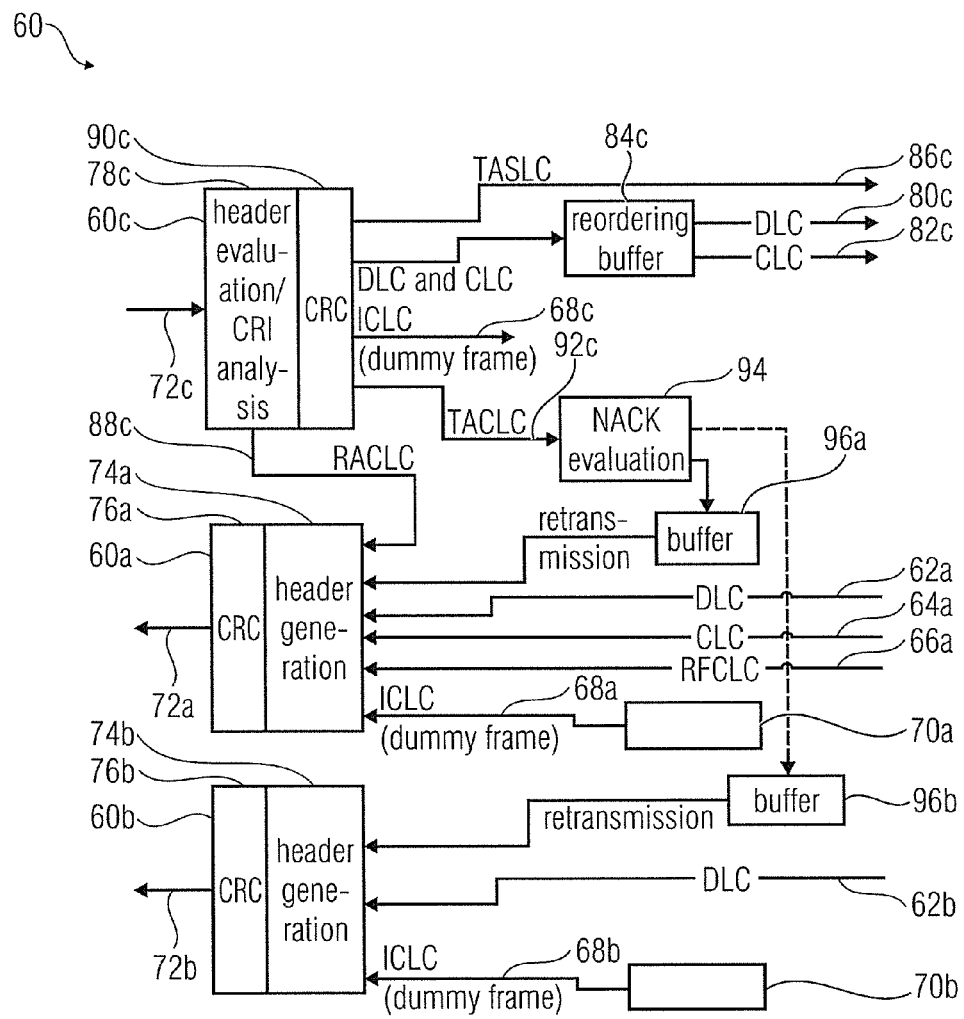
FIG. 4b exemplarily shows a block diagram of an interface for interfacing a radio frequency transceiver with a baseband processor according to an embodiment.
Figure 4C:
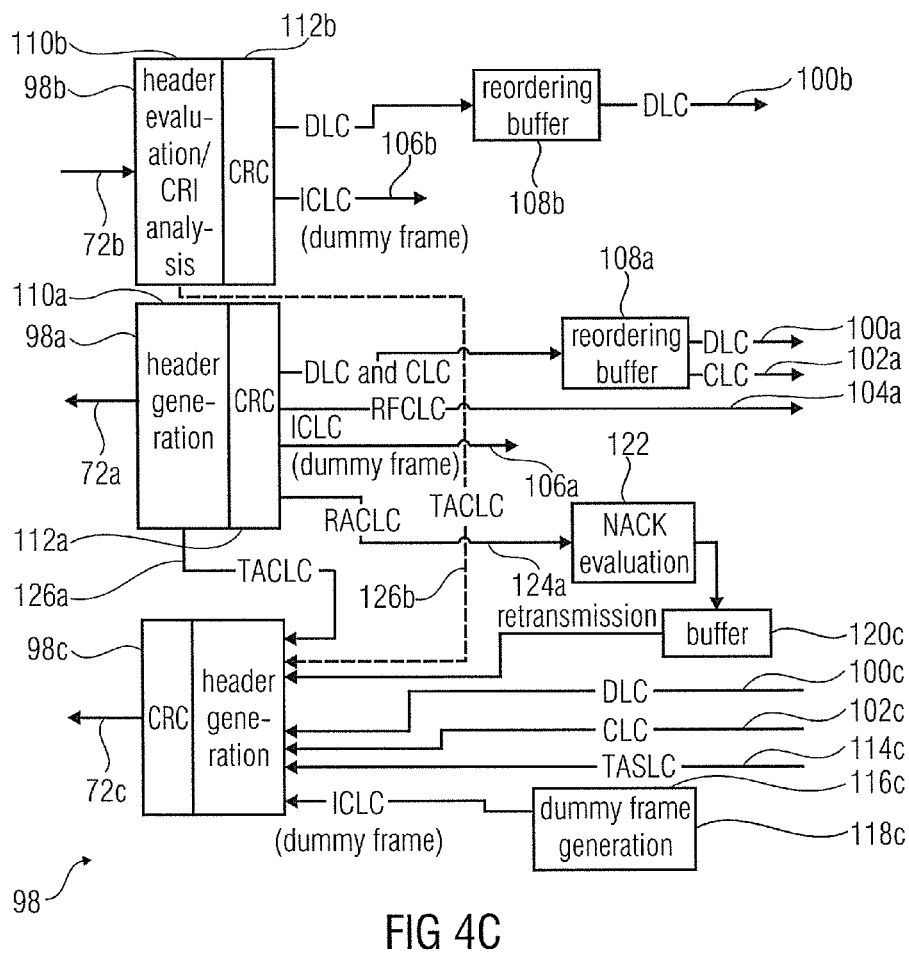
FIG. 4c exemplarily shows a block diagram of an interface for interfacing a baseband processor with a radio frequency transceiver according to an embodiment.

Below, an embodiment of the interface of the radio frequency transceiver 12 and an embodiment of the (matching) interface of the baseband processor will be discussed in more detail, wherein FIG. 4b shows the interface 60 of the radio frequency transceiver 12 and FIG. 4c shows the interface of the baseband processor.

FIG. 4b exemplarily shows a block diagram of the interface 60 of the radio frequency transceiver. The interface 60 comprises the three sub-interfaces 60a, 60b and 60c. It should be noted that this interface 60 complies regarding the basic functionality with the interface 10 described with respect to FIG. 1a.

A first sub-interface 60a receives the first inbound IQ data stream via a data logical channel 62a (DLC), RX control signals via a control logical channel 64a (CLC) and radio frequency control signals via a radio frequency control logical channel 66a (RFCLC) are received from the radio frequency transceiver. Furthermore, the first sub-interface 60a receives interface control signals of the first sub-interface 60a via an interface control logical channel 68a (ICLC) generated by a dummy frame generator 70a. These streams and signals, respectively, are packetized to obtain first inbound IQ data packets and RX control packets, and transmitted to the baseband processor via the first set of RX lanes 72a. The packetizing is performed by the first sub-interface 60a by means of a header generator 74a and a cyclic redundancy check 76a (CLC) for producing a checksum in order to detect errors in the transmission. The first inbound IQ data packets, RX control packets and interface control signals transmitted via the first set 72a of RX lanes are distinguishable by their header which may comprise the data packet identifier, information on the packet type and on the belonging to the respective logical channel 62a, 64a, 66a or 68a. The second sub-interface 60b receives a second inbound IQ data stream via a data logical channel 62b (DLC) as well as interface control signals via an interface control logical channel 68b (ICLC) generated by a dummy frame generator 70b, and transmits the packetized inbound IQ data packets and the packetized interface control signals to the baseband processor via a second set 72b of RX lanes. The second sub-interface 60b also comprises a header generator 74b and a cyclic redundancy check 76b (CRC). The header generator 74b adds the header indicating the respective logical channel (data logical channel 62b or interface control logical channel 68b) to the transmitted packets, while the cyclic redundancy check 76b ads a checksum to the transmitted packets.

The first and second sub-interface 60a and 60b comprise a first buffer 96a and a second buffer 96b configured to buffer a first and second portion of the inbound IQ data stream. The buffers 96a and 96b are configured to output the first or second portion of the inbound IQ data stream, respectively, as buffered to the sub-interfaces 60a and 60b, respectively, in order to retransmit the first or second portion of the inbound IQ data stream via the respective first or second set 72a or 72b of RX lanes in accordance with a received RX not-acknowledge signal, as discussed above. This RX not-acknowledge signal is received via a not-acknowledge signal evaluator 94 and via a TX not-acknowledge control logical channel 92c of the third sub-interface 60c. The not-acknowledge signal evaluator 94 evaluates the RX not-acknowledge signal and forwards same to the first buffer 96a of the first sub-interface 60a or to the second buffer 96b of the second sub-interface 60b depending on the RX lane indicator within the RX not-acknowledge signal. This so called autonomous repeat request (ARQ) mechanism according to the MIPI standard allows buffering of the last eight packets or frames for error recovery. Here, it is advantageous that this embodiment enables buffering of the last eight packets for every set 72a and 72b of RX lanes, wherein other solutions for increasing the data rate, e.g. by using a higher interface frequency or splitting the data to multiple RX lanes, only provide buffering of the last eight packets for the entire interface path. Therefore, it is advantageous that the above embodiment does not lead to a loss of data in critical scenarios.

The third sub-interface 60c receives the outbound IQ data packets, TX control packets, interface control signals and time accurate strobe information via a TX lane 72c as well as RX not-acknowledge signals. In order to distinguish the different packets and signals the third sub-interface 60c comprises a header evaluator 78c which distributes the single packets and signals among the different logical channels according to the belonging of the respective packets of a different type (e.g. data packets or control packets). The outbound IQ data stream depacketized from outbound IQ data packets are output to the data logical channel 80c (DLC) and the TX control signals are output the control logical channel 82c (CLC). The interface control signal as well as time accurate strobe information are output via a interface control logical channel 68c (ICLC) and via a time accurate strobe logical channel 86c (TASLC), respectively, wherein the RX not-acknowledge signals are output to the not-acknowledge signal evaluator 94 via the TX not-acknowledge control logical channel 92c (TACLC). The third sub-interface 60c further comprises a cyclic running index analyzer 78c (CRI analyzer) configured to perform a forward error detection in order to identify a defective outbound IQ data packet and output a TX not-acknowledge signal identifying the defective outbound IQ data packet within the outbound IQ data packets by indicating the data packet identifier of same. This TX not-acknowledge signal is output by the cyclic running index analyzer 78c via an RX not-acknowledge control logical channel 88c (RACLC) to the first sub-interface 60a which transmits the TX not-acknowledge signal to the baseband processor in order to initiate a retransmission of the respective defective outbound IQ data packet. Furthermore, the third sub-interface 60c may comprise an optional cyclic running check 90c for further forward error correction within the radio frequency receiver optional and recording buffer 84c for buffering the outbound IQ data stream and the TX control signal.

FIG. 4c shows an interface 98 of a baseband processor. This interface comprises first and second sub-interfaces 98a and 98b for inbound IQ data packets and a third sub-interface 98c for outbound IQ data packets. It should be noted that this interface 98 complies regarding the basic functionality with the interface 11 described with respect to FIG. 1a.

The first sub-interface 98a is configured to receive first inbound IQ data packets from the radio frequency transceiver via the first set 72a of RX lanes (cf. FIG. 4b). Furthermore, the first sub-interface 98a receives the RX control packets including the radio frequency control signals and the interface control signals as well as the TX not-acknowledge signals via this first set 72a of RX lanes. The depacketized first inbound IQ data stream is output via the data logical channel 100a (DLC) to the baseband processor, while the depacketized RX control signals are output via the control logical channel 102a (CLC) to the baseband processor. The radio frequency control signal are output by the radio frequency control logical channel 104a (RFCLC) and the interface control signals are output by the interface control logical channel 106a (ICLC) to the baseband processor. The first sub-interface 98a may comprise a recording buffer configured to buffer the first inbound IQ data stream and the RX control signal. The second sub-interface 98b is configured to receive second inbound IQ data packets from the radio frequency transceiver via the second set 72b of RX lanes (cf. FIG. 4b), and to output the depacketized second inbound IQ data stream to the baseband processor via a data logical channel 100b (DLC). This second inbound IQ data stream may be buffered by a second recording buffer 108b. Furthermore, the second sub-interface 98b is configured to receive interface control signals and to output same to the baseband processor via the interface control logical channel 106b. The first and second sub-interfaces 98a and 98b may comprise a header evaluator 110a and 110b for the mapping between the received packets of a different packet type and the different logical channels 100a, 100b, 102a, 104a, 106a, 106b, 108a or 108b (DLC, CLC, ICLC, etc). Furthermore, the two interfaces 98a and 98b may comprise a cyclic redundancy check 112a and 112b (CRC), respectively, in order to produce a checksum for detecting errors in the further processing.

The first and second sub-interfaces 98a and 98b comprise a cyclic running index analyzer 110a and 110b analyzer configured to perform a forward error detection in order to identify a defective first or second inbound IQ data packet within the first or second inbound IQ data packets, and output a first or second RX not-acknowledge signal comprising the data packet identifier and the RX lane indicator. Therefore, the cyclic running index analyzer 110a of the first sub-interface 98a is electrically connected to the third sub-interface 98c via a first TX not-acknowledge control logical channel 126a (TACLC) and the cyclic running index analyzer 110b of the second sub-interface 98b is electrically connected to the third sub-interface 98c via a second TX not-acknowledge control logical channel 126b (TACLC). The third sub-interface 98c transmits the first and second RX not-acknowledge signal received via the TX not-acknowledge control logical channels 126a and 126b (TACLC) to the radio frequency transceiver via the TX lane 72c (cf. FIG. 4b).

The third sub-interface 98c is further configured to transmit outbound IQ data packets, which are received via the data logical channel 100c (DLC), via the TX lane 72c. Interface control signals generated by using a dummy frame generator 116c and received via an interface control logical channel 118c (ICLC) are also transmitted by third sub-interface 98c via the TX lane 72c. Furthermore, the third sub-interface 98c receives time accurate strobe information via the time accurate strobe logical channel 114c (TASLC), packetizes same signals to obtain packets, and transmits the packets to the radio frequency transceiver via the TX lane 72c. The third sub-interface 98c may comprise a buffer 120c configured to buffer a portion of the outbound IQ data stream. This portion is retransmitted as buffered in accordance with the TX not-acknowledge signal received by the first sub-interface 98a, wherein the TX not-acknowledge signal is transmitted from the first sub-interface 98a via a RX not-acknowledge control logical channel 124a (RACLC) to a not-acknowledge signal evaluator 122 which controls the buffer 120c and is configured to initiate a retransmission of an outbound IQ data stream.

Figure 5A:
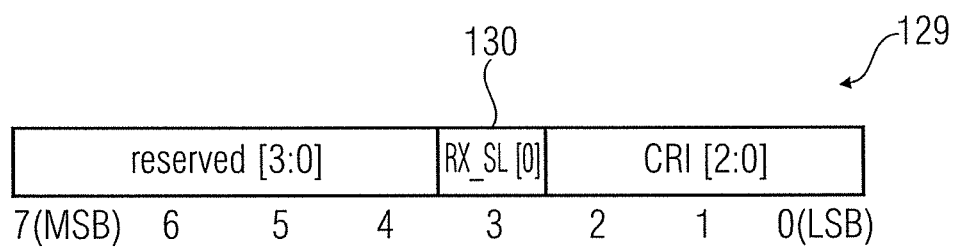
FIG. 5a schematically shows a RX not-acknowledge signal according to an embodiment.

As discussed with respect to FIG. 4b, the first and second RX not-acknowledge signals are distinguishable due to the RX lane indicator. FIG. 5a illustrates an embodiment of a RX not-acknowledge signal 129, also referred to as NACK frame, having an 8-bit payload value. The first three bits (2:0) are used for the data packet identifier, also referred to as cyclic running index field, wherein all other bits are reserved. The RX lane indicator for the respective set of RX lanes may be placed into the reserved field 130 (marked with RX_SL). The value of "0" may be related to the first set of RX lanes, wherein the value of "1" may be related to the second set of RX lanes. Here, it is advantageous that this solution is fully compatible to the standard interface. Background thereof is that, in case of using just the first and third sub-interfaces, corresponding to a normal interface mode (cf. FIG. 1a), the value of the RX lane indicator 130 is "0" because non RX lane indicator 130 is used. This value of the RX lane indicator 130 results in an RX not-acknowledge signal of the first sub-interface either in case of the normal interface mode or an enhanced interface mode using three sub-interfaces for interfacing. In other words, the RX not-acknowledge signal 129 having the value "0" of the RX lane indicator 130 complies with the standard RX not-acknowledge signal of a standard interface using just the first and the third sub-interface (cf. FIG. 1a). Furthermore, in case of using more than three sub-interfaces, the field could also be extended to more than one bit.

Figure 5B:
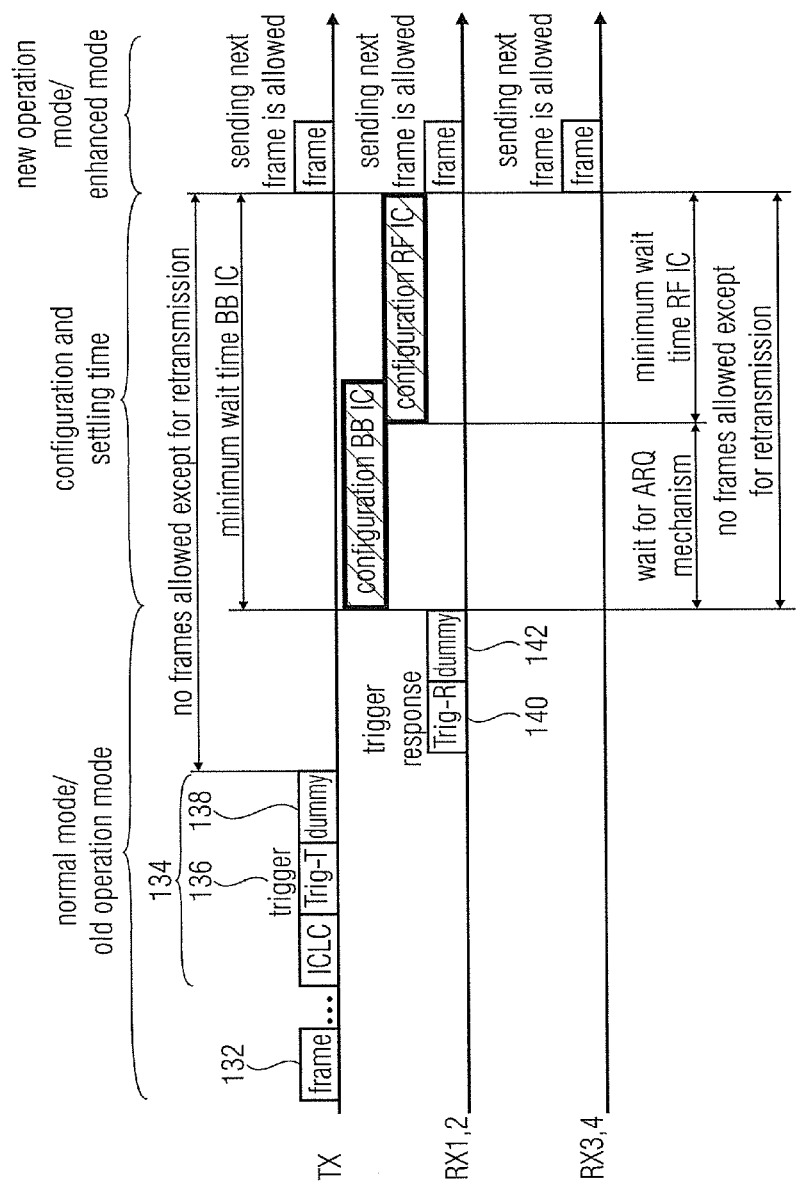
FIG. 5b schematically shows a progress of an interface communication for illustrating a switching between a normal and an enhance mode of an interface according to an embodiment.

According to another embodiment, the third sub-interface is configured to switch the second sub-interface between an enabled state, corresponding to an enhanced mode of the interface for high data rates, and a disabled mode, corresponding to a normal mode of the interface for a reduced data rate. It should be noted that the normal mode corresponds to the operation mode of the standard interface as shown in FIG. 1a. Here, the third interface performs the switching of the second interface depending on the interface control signal from the baseband processor. FIG. 5b illustrates the switching between the normal mode and the enhanced mode by plotting the exchanged interface control signals over the time.

The diagram illustrates the transmission of an outbound IQ data packet 132 before transmitting interface control signals 134 via the TX lane. The transmitted interface control signal 136 is the switching trigger for switching the interface into the enhanced mode. After the transmission of the trigger 136 a dummy frame 138 is transmitted from the third sub-interface of the baseband processor to the radio frequency transceiver. The interface control signals 134 blocks the whole interface for the configuration of the interface and for further interface communication. As a response to the trigger 136 sent via the TX lane, the first sub-interface of the radio frequency transceiver sends a trigger response 140 and a dummy frame 142 to the baseband processor and starts the configuration of its three sub-interfaces and of the radio frequency transceiver. The configuration of the three interfaces of the baseband processor is finished before finishing the configuration of the radio frequency transceiver. After the configuration the interface is switched into the enhanced mode and ready for transmitting inbound and outbound IQ data packets. Due to the switching between the normal mode and the enhanced mode, the interface offers higher scalability for scenarios where lower interface bandwidth is required, when compared to using two interfaces or using a high interface frequency, or compared to the solution for splitting data by multiple RX lanes.

FIG. 5c shows a table of the arguments of the interface control signals that may be used for switching between the normal mode and the enhanced mode and for enabling further RX lanes within the sets of RX lanes. The argument 3Dh by using the identifier 08h for the interface control signal corresponds to the configuration trigger (cf. 136, FIG. 5b) for enabling the enhanced mode. This interface control signal is sent by the third sub-interface via the TX lane. The argument D3h by using the identifier 09h for the interface control signal corresponds to the trigger response (140, FIG. 5b) which is sent by the first sub-interface of the radio frequency transceiver via the first set of RX lanes. This message shall be sent in response to the configuration trigger (3Dh, 08h). After that the execution of the previously programmed configuration changes shall be initiated in the radio frequency transceiver while changes in the baseband processor shall be initiated after successful receipt of this message. The argument 01h by using the identifier 10h sent from the third sub-interface of the baseband processor via the TX lane enables all configured RX lanes of the first and/or second set of RX lanes. The RX lanes may be activated individually by using the identifier 41h for the interface control signal.

Referring to FIG. 4a, the interface 60 may be connected to more than one radio frequency transceiver 12, for example, in case of using a diversity antenna, according to an alternative embodiment.

Although in the embodiments discussed above the first and second set of RX lanes comprise two RX lanes, it should be noted that the first and/or second set of RX lanes may comprise one or more than two RX lanes depending on the needed data rate. Furthermore, the number of RX data channels may vary. Therefore, according to further embodiments, each sub-interface may comprise, for example, one RX data channel, 4 or 8 RX data channels. Analogously, the number of TX channels and TX lanes may be varied.

According to a further embodiment, the interface may comprise further sub-interfaces for increasing the data rate between the radio frequency transceiver and the baseband processor. A further alternative embodiment of the interface may have also comprise a further third sub-interface (cf. 60c, FIG. 4a) for increasing the uplink data rate.

Although in above embodiments some aspects have been described in context of an apparatus, it is clear that these aspects also represent a description of the corresponding method for interfacing a radio frequency transceiver with a baseband processor and for interfacing a baseband processor with a radio frequency transceiver, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a non-transitory machine readable carrier. Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein. A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example afield programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. An interface for interfacing a radio frequency transceiver with a baseband processor, the interface comprising:
   a first sub-interface configured to receive a first inbound IQ data stream, packetize the first inbound IQ data stream to obtain first inbound IQ data packets, and transmit the first inbound IQ data packets to the baseband processor via a first set of RX lanes, wherein each first inbound IQ data packet comprises a data packet identifier out of a common set of possible data packet identifiers;
   a second sub-interface configured to receive a second inbound IQ data stream, packetize the second inbound IQ data stream to obtain second inbound IQ data packets, and transmit the second inbound IQ data packets to the baseband processor via a second set of RX lanes, wherein each second inbound IQ data packet comprises a data packet identifier out of the common set of possible data packet identifiers; and
   a third sub-interface configured to receive outbound IQ data packets from the baseband processor via a TX lane, and depacketize the outbound IQ data packets to obtain an outbound IQ data stream;
   wherein the third sub-interface is configured to further receive an RX not-acknowledge signal from the baseband processor via the TX lane, wherein the RX not-acknowledge signal identifies a defective first or second inbound IQ data packet within the first and second inbound IQ data packets by indicating the data packet identifier of the defective first or second inbound IQ data packet and the first or second set of RX lanes via which the defective first or second inbound IQ data packet is transmitted.

2. The interface according to claim 1, wherein the first and second sub-interfaces are configured to packetize the respective first and second inbound IQ data packets separately and in parallel.

3. The interface according to claim 1, wherein the third sub-interface is configured to switch the second sub-interface between an enabled state corresponding an enhanced mode of the interface and a disabled state corresponding to a normal mode of the interface.

4. The interface according to claim 3, wherein the third sub-interface is configured to perform the switching depending on an interface control signal from the baseband processor.

5. The interface according to claim 1, wherein the first sub-interface is configured to receive an RX control signal, packetize the RX control signal to obtain an RX control packet, and transmit the RX control packet to the baseband processor via the first set of RX lanes; and
   wherein the third sub-interface is configured to receive a TX control packet from the baseband processor via the TX lane, and obtain a TX control signal from the TX control packet.

6. The interface according to claim 3, wherein the third sub-interface is configured to ignore a portion of the RX not-acknowledge signal, corresponding to an identifier of the first set of RX lanes, in the normal mode and use the portion of the RX not-acknowledge signal, corresponding to an identifier of the second set of RX lanes, in the enhanced mode.

7. The interface according to claim 1, wherein the first inbound IQ data packets and the second inbound IQ data packets, the outbound IQ data packets and the RX not-acknowledge signal belong to different logic channels, respectively, and comprise a header indicative of the respective logical channel.

8. The interface according to claim 1, wherein the first sub-interface comprises a first buffer configured to buffer a portion of the first inbound IQ data stream, and retransmit the portion of the first inbound IQ data stream as buffered in accordance with the RX not-acknowledge signal, and
   wherein the second sub-interface comprises a second buffer configured to buffer a portion of the second inbound IQ data stream, and retransmit the portion of the second inbound IQ data stream as buffered in accordance with the RX not-acknowledge signal.

9. The interface according to claim 1, wherein the first set of RX lanes of the first sub-interfaces comprises a plurality of RX lanes, and wherein the second set of RX lanes of the second sub-interfaces comprise a plurality of RX lanes.

10. The interface according to claim 1, wherein the first sub-interface comprises a first multiplexer configured to multiplex a plurality of inbound IQ data streams to the first inbound IQ data stream, and wherein the second sub-interface comprises a second multiplexer configured to multiplex a plurality of inbound IQ data streams to the second inbound IQ data stream.

11. The interface according to claim 1, wherein the third sub-interface is configured to perform a forward error detection in order to identify a defective outbound IQ data packet, and output a TX not-acknowledge signal identifying the defective outbound IQ data packet within the outbound IQ data packets by indicating the data packet identifier of the defective outbound IQ data packet.

12. An interface for interfacing a baseband processor with a radio frequency transceiver, the interface comprising:
    a first sub-interface configured to receive first inbound IQ data packets from the radio frequency transceiver via a first set of RX lanes, perform a forward error detection in order to identify a defective first inbound IQ data packet within the first inbound IQ data packets, and output a first RX not-acknowledge signal identifying the defective first inbound IQ data packet by indicating the data packet identifier of the defective first inbound IQ data packet and the first set of RX lanes via which the defective first inbound IQ data packet is received;
    a second sub-interface configured to receive second inbound IQ data packets from the radio frequency transceiver via a second set of RX lanes, perform a forward error detection in order to identify a defective second inbound IQ data packet within the second inbound IQ data packets, and output a second RX not-acknowledge signal identifying the defective second inbound IQ data packet by indicating the data packet identifier of the defective second inbound IQ data packet and the second set of RX lanes via which the defective second inbound IQ data packet is received; and
    a third sub-interface configured to transmit outbound IQ data packets to the radio frequency transceiver via a TX lane, and transmit the RX not-acknowledge signal to the radio frequency transceiver via a TX lane.

13. The interface according to claim 12, wherein each outbound IQ data packet comprises a data packet identifier out of a common set of possible data packet identifiers; and
    wherein the first sub-interface is configured to further receive a TX not-acknowledge signal from the radio frequency transceiver via the first set of RX lanes, wherein the TX not-acknowledge signal identifies a defective outbound IQ data packet within the outbound IQ data packets by indicating the data packet identifier of the defect outbound IQ data packet.

14. The interface according to claim 13, wherein the third sub-interface comprises a third buffer configured to buffer a portion of a outbound IQ data stream, and retransmit the portion of the outbound IQ data stream as buffered in accordance with the TX not-acknowledge signal.

15. The interface according to claim 12, wherein the first sub-interface is configured to receive a RX control packet from the radio frequency transceiver via the first set of RX lanes, and obtain a RX control signal from the RX control packet; and wherein the third sub-interface is configured to receive a TX control signal, packetize the TX control signal to obtain a TX control packet, and transmit the TX control packet to the radio frequency transceiver via the TX lane.

16. The interface according to claim 12, wherein the first and second sub-interfaces are connected to an OFDM which is configured to process the first and second inbound IQ data stream packetized in the first and second inbound IQ data packets.

17. A method for interfacing a radio frequency transceiver with a baseband processor, the method comprising:
    a first step of receiving a first inbound IQ data stream, packetizing the first inbound IQ data stream to obtain first inbound IQ data packets, and transmitting the first inbound IQ data packets to the baseband processor via a first set of RX lanes of a first sub-interface, wherein each first inbound IQ data packet comprises a data packet identifier out of a common set of possible data packet identifiers;
    a second step of receiving a second inbound IQ data stream, packetizing the second inbound IQ data stream to obtain second inbound IQ data packets, and transmitting the second inbound IQ data packets to the baseband processor via a second set of RX lanes of a second sub-interface, wherein each second inbound IQ data packet comprises a data packet identifier out of the common set of possible data packet identifiers; and
    a third step of receiving outbound IQ data packets from the baseband processor via a TX lane of a third sub-interface, and depacketizing the outbound IQ data packets to obtain an outbound IQ data stream, while receiving a RX not-acknowledge signal from the baseband processor via the TX lane of the third sub-interface, wherein the RX not-acknowledge signal identifies a defective first or second inbound IQ data packet within the first and second inbound IQ data packets by indicating the data packet identifier of the defective first or second inbound IQ data packet and the first or second set of RX lanes via which the defective first or second inbound IQ data packet is transmitted.

18. A method for interfacing a baseband processor with a radio frequency transceiver, the method comprising:
    a first step of receiving first inbound IQ data packets from the radio frequency transceiver via a first set of RX lanes of a first sub-interface, performing a forward error detection in order to identify a defective first inbound IQ data packet within the first inbound IQ data packets, and outputting a first RX not-acknowledge signal identifying the defective first inbound IQ data packet by indicating the data packet identifier of the defective first inbound IQ data packet and the first set of RX lanes via which the defective first inbound IQ data packet is received;
    a second step of receiving second inbound IQ data packets from the radio frequency transceiver via a second set of RX lanes of a second sub-interface, performing a forward error detection in order to identify a defective second inbound IQ data packet within the second inbound IQ data packets, and outputting a second RX not-acknowledge signal identifying the defective second inbound IQ data packet by indicating the data packet identifier of the defective second inbound IQ data packet and the second set of RX lanes via which the defective second inbound IQ data packet is received; and
    a third step of transmitting outbound IQ data packets to the radio frequency transceiver via a TX lane of a third sub-interface, while transmitting the RX not-acknowledge signal to the radio frequency transceiver via a TX lane of the third sub-interface.

19. The method according to claim 18, wherein the three steps are performed in parallel.

20. Computer readable non-transitory digital storage medium having stored thereon a computer program having a program code for performing, when running on a computer, a method for interfacing a baseband processor with a radio frequency transceiver, the method comprising:
- a first step of receiving a first inbound IQ data stream, packetizing the first inbound IQ data stream to obtain first inbound IQ data packets, and transmitting the first inbound IQ data packets to the baseband processor via a first set of RX lanes of a first sub-interface, wherein each first inbound IQ data packet comprises a data packet identifier out of a common set of possible data packet identifiers;
- a second step of receiving a second inbound IQ data stream, packetizing the second inbound IQ data stream to obtain second inbound IQ data packets, and transmitting the second inbound IQ data packets to the baseband processor via a second set of RX lanes of a second sub-interface, wherein each second inbound IQ data packet comprises a data packet identifier out of the common set of possible data packet identifiers; and
- a third step of receiving outbound IQ data packets from the baseband processor via a TX lane of a third sub-interface, and depacketizing the outbound IQ data packets to obtain an outbound IQ data stream, while receiving a RX not-acknowledge signal from the baseband processor via the TX lane of the third sub-interface, wherein the RX not-acknowledge signal identifies a defective first or second inbound IQ data packet within the first and second inbound IQ data packets by indicating the data packet identifier of the defective first or second inbound IQ data packet and the first or second set of RX lanes via which the defective first or second inbound IQ data packet is transmitted.

* * * * *